J. L. Rees,

Cog Gearing Spring.

Nº 65,506. Patented June 4, 1867.

Witnesses:
J. C. Kingsbury
W. T. Hanna

Inventor;
Jonah L. Reed

United States Patent Office.

JONAH L. REES, OF PEORIA, ILLINOIS.

Letters Patent No. 65,506, dated June 4, 1867.

---

IMPROVEMENT IN COG-GEARING SPRINGS.

---

The Schedule referred to in these Letters Patent and making part of the same.

---

TO ALL WHOM IT MAY CONCERN:

Be it known that I, JONAH L. REES, of Peoria, in the county of Peoria, and State of Illinois, have invented an Improvement for Obviating the Irregular Motion of Steam-Power upon Mill-Gearing and Preventing the usual Cutting and Noise of heavy iron Cog-Wheels; and I do hereby declare that the following is a full and exact description thereof, viz:

Figure 1 represents an oblique view. A is a bevel cog-wheel on upright shaft B, supported, (as seen in fig. 3,) by collar C. D represents a cast-iron hub resting on bevel-wheel A, keyed to shaft R, with arms E extending down between the arms F of the bevel-wheel A. G is a round rubber car-spring, one end secured in socket H on the end of arm E, pressed against arm F by adjusting-bolt I, screwed into end of arm E, and head against other arm F, with tightening-tap L.

Figure 2:
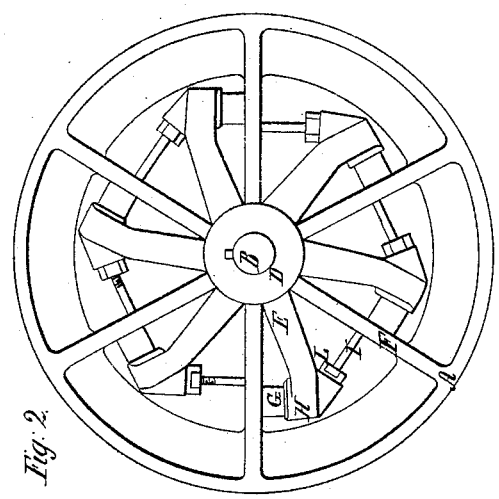
Figure 2 represents a perpendiular view.
Figure 3:
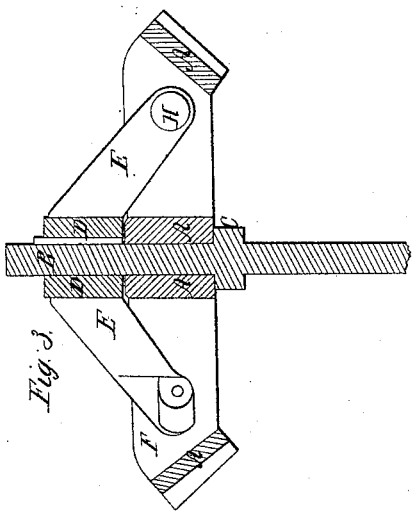
Figure 3 represents a sectional view of bevel-wheel A A, hub D D, shaft B, arms E E, socket H and collar C.
Figure 1:
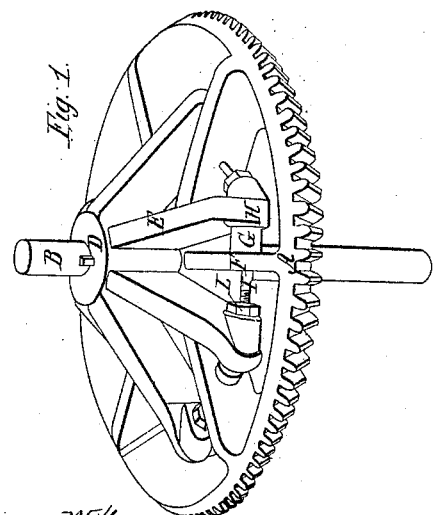
Figure 4:
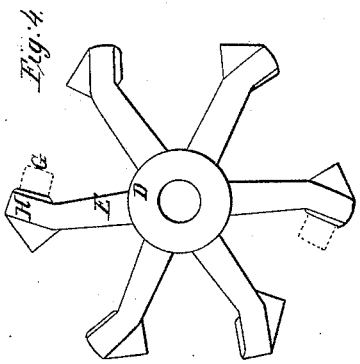
Figure 4 represents a perpendicular view of hub D, arms E, sockets H, and springs G.

Construction.

Take the main gearing-wheel A (bevel or otherwise) of any mill and support it movably on shaft B by collar C. Upon this shaft B, and above the wheel A, is keyed the hub D, with same number of arms E as cog-wheel A projecting down between the arms F of cog-wheel A. On one side of the end of the arm E is formed a socket, H, for the reception of one end of rubber spring G. The other side is arranged to secure the adjusting-bolt I with its tightening-tap L.

What I claim as my invention, and desire to secure by Letters Patent, is—

The hub D, with its arms E, rubber spring G, adjusting-bolt I, and tightening-tap L, or their equivalent, in connection with the arms F of bevel-wheel A, working in the manner and for the purpose specified.

JONAH L. REES.

Witnesses:
   J. C. KINGBURY,
   W. T. HANNA,
   HORACE CLARK.